United States Patent
Marcelli

(10) Patent No.: US 12,179,444 B2
(45) Date of Patent: Dec. 31, 2024

(54) METHOD AND SEMI-FINISHED ITEM FOR PRODUCING COMPOSITE PRODUCTS AND THE PRODUCTS THUS OBTAINED

(71) Applicant: AUTOMOBILI LAMBORGHINI S.P.A., Sant'Agata Bolognese (IT)

(72) Inventor: Fabio Marcelli, Bologna (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 204 days.

(21) Appl. No.: 17/581,205

(22) Filed: Jan. 21, 2022

(65) Prior Publication Data

US 2022/0143937 A1 May 12, 2022

Related U.S. Application Data

(62) Division of application No. 16/483,601, filed as application No. PCT/IB2018/051019 on Feb. 20, 2018, now Pat. No. 11,254,073.

(30) Foreign Application Priority Data

Feb. 21, 2017 (IT) .......................... 102017000019306

(51) Int. Cl.
*B29C 70/48* (2006.01)
*B29C 70/08* (2006.01)
(Continued)

(52) U.S. Cl.
CPC ............ *B29C 70/48* (2013.01); *B29C 70/086* (2013.01); *B29C 70/443* (2013.01); *B32B 5/024* (2013.01);
(Continued)

(58) Field of Classification Search
CPC ....... B29C 70/44; B29C 70/086; B29C 70/48; B29C 70/443; B32B 5/26; B32B 27/302;
(Continued)

(56) References Cited

U.S. PATENT DOCUMENTS 5,124,196 A  6/1992  Figge, Sr.
5,200,133 A  4/1993  Dieul et al.
(Continued)

FOREIGN PATENT DOCUMENTS

CN   1668433 A    9/2005
CN   101287587 A  10/2008
(Continued)

OTHER PUBLICATIONS

International Search Report and Written Opinion dated Jul. 31, 2018 from related International Patent Application No. PCT/IB2018/051019.

(Continued)

*Primary Examiner* — Monica A Huson
*Assistant Examiner* — Kelsey C Grace
(74) *Attorney, Agent, or Firm* — SHUTTLEWORTH & INGERSOLL, PLC; Timothy J. Klima

(57) ABSTRACT

A method for producing products made of composite material, including the following operating steps: placing between a first mould and at least a second mould at least one layer of composite material fibre fabric and at least a first layer of composite material fibres, wherein a layer of non-polymerized, composite material resin, substantially free of hardener, is placed between the fabric layer and the first mould; injecting resin and hardener between the first mould and the second mould to impregnate the layer and the first fibre layer with the injected resin and polymerizing the injected resin and the resin layer with the injected hardener. A semi-finished item which can be used in this method and to a product made using this method and/or with this semi-finished item.

2 Claims, 4 Drawing Sheets

(51) Int. Cl.
*B29C 70/44* (2006.01)
*B32B 5/02* (2006.01)
*B29K 101/12* (2006.01)
*B29K 105/00* (2006.01)
*B29K 105/08* (2006.01)
*B29K 307/04* (2006.01)

(52) U.S. Cl.
CPC .. *B29K 2101/12* (2013.01); *B29K 2105/0005* (2013.01); *B29K 2105/089* (2013.01); *B29K 2307/04* (2013.01); *B32B 2260/021* (2013.01); *B32B 2260/046* (2013.01); *B32B 2262/106* (2013.01)

(58) Field of Classification Search
CPC ....... B32B 5/024; B32B 27/12; B32B 27/365; B32B 27/34; B32B 27/36; B32B 1/02; B32B 2262/106; B32B 2255/02; B32B 2307/718; B32B 250/05; B32B 2260/046; B32B 2605/00; B32B 2262/0253; B32B 2274/00; B32B 2262/0261; B32B 2262/0284; B32B 2260/021; B32B 2260/023; B32B 2262/023; B32B 2255/26; B32B 262/0276; B32B 2307/732; B29B 15/127; B29K 2307/04; B29K 2105/089; B29K 2101/12; B29K 2105/0005

See application file for complete search history.

(56) References Cited

U.S. PATENT DOCUMENTS

| | | | |
|---|---|---|---|
| 5,427,726 A | * | 6/1995 | White .................. C08J 5/249 264/137 |
| 8,202,454 B2 | | 6/2012 | Burchardt et al. |
| 2004/0130072 A1 | | 7/2004 | Sekido et al. |
| 2012/0093659 A1 | * | 4/2012 | Muschke .............. B29C 70/086 264/266 |

FOREIGN PATENT DOCUMENTS

| | | |
|---|---|---|
| CN | 102514207 A | 6/2012 |
| CN | 102935754 A | 2/2013 |
| CN | 103802333 A | 5/2014 |
| CN | 104105421 A | 10/2014 |
| EP | 0415869 A2 | 3/1991 |

OTHER PUBLICATIONS

Chinese Office Action dated Nov. 5, 2020 from related Chinese Patent Application No. 2018800129432.

* cited by examiner

METHOD AND SEMI-FINISHED ITEM FOR PRODUCING COMPOSITE PRODUCTS AND THE PRODUCTS THUS OBTAINED

This application is a divisional of U.S. patent application Ser. No. 16/483,601 filed Aug. 5, 2019, which is a National Phase of International Application PCT/IB2018/051019 filed Feb. 20, 2018 which designated the U.S.

This application claims priority to Italian Patent Application No. 102017000019306 filed Feb. 21, 2017, which application is incorporated by reference herein.

TECHNICAL FIELD

This invention relates to a method for producing composite products comprising layers of fibres, specifically layers of carbon fibre fabrics. This description also relates to a semi-finished item which can be used in this method and to a product made using this method and/or with this semi-finished item.

BACKGROUND ART

As is known, the RTM (Resin Transfer Moulding) method can be used to produce parts from composite materials comprising carbon fibre fabrics. In this known method, one or more superposed layers of dry fabric, that is to say, fabric which is substantially not impregnated with resins, are placed between two matching moulds into which a resin mixed with a hardener is injected under high pressure in such a way that the resin polymerizes in the mould to obtain the finished product.

In a variant of this method, known as RTM-L (RTM-Light), the resin is injected at a lower pressure so as to increase the working life of the moulds and thus reduce investment costs.

While the resin is being injected, however, in the RTM and RTM-L methods, the fibres of the fabric layers, especially the outer layers, are displaced on account of the resin pressure gradients at the impregnation stage, with consequent loss of weave regularity, worsening the aesthetic aspect of the final product.

In another prior art method, fabrics previously impregnated with resin—known as prepreg—are used. These are reheated and pressed on at least one mould without injecting further resin. This prior art method allows obtaining composite products whose outer layers maintain weave regularity even after resin polymerization. It is, however, more expensive than the RTM method and, precisely because of pre-impregnation of the layers, the structural properties of the products made are not as good.

AIM OF THE INVENTION

This disclosure therefore has for an aim to provide a method which is free of the above mentioned disadvantages. This aim is achieved by a method and a semi-finished item whose main features are specified in the appended claims.

Thanks to the method of this disclosure, it is possible to make composite material parts having a good aesthetic appearance and excellent structural properties using dry fibre fabrics and moulds into which resin and hardener are injected. This method can therefore be automated at least partly, thanks also to the semi-finished item of this disclosure, which can be prepared during a preliminary stage. In effect, at least one outside surface of the product thus obtained comprises a fabric whose weave is substantially regular and whose high visual quality meets the high standards of the automotive industry, such as, for example, the "Class A" standard.

Thus, whereas prior art RTM methods cannot guarantee products with high aesthetic features on account of the deformation and displacement of the fibres of the outer layer during resin injection, the method of this disclosure allows obtaining products whose appearance is the same as that obtained using prepreg methods. This method therefore combines the advantages of reduced production time and excellent mechanical properties typical of RTM methods with the improved aesthetic finish of products made using prepreg methods.

These advantages are obtained above all thanks to the layer of non-polymerized resin which causes the outer fabric layer to adhere to a functional surface of the mould prior to injection of the resin which impregnates this fabric layer and the structural layers superposed thereon. Further, the hardener injected with the resin is sufficient in quantity to also polymerize the resin applied on the fabric layer.

Thanks also to a thermoplastic film applied between the fabric layer and a structural layer adjacent thereto, the fabric layer is held more securely in the correct position during resin injection.

The present method is further simplified using a semi-finished item comprising the fabric layer, the layer of resin substantially free of hardener and the thermoplastic film. The semi-finished item can be easily cut into predetermined shapes and even stored for use at a later stage. The product obtained using this method or semi-finished item can be distinguished from prior art products made of composite material thanks to the presence of the thermoplastic film between the outer fabric layer and the adjacent structural layer.

During certain specific steps of the method, the fabric layer and the structural layer are pressed and/or heated on at least one mould in order to improve the bond between these layers before the resin is injected, thus obtaining a better final product.

BRIEF DESCRIPTION OF THE DRAWINGS

Further advantages and features of the method, semi-finished item and product according to this invention will become clearer to those well versed in the trade from the following detailed, non-limiting description of an embodiment with reference to the accompanying drawings, in which.

DETAILED DESCRIPTION OF PREFERRED EMBODIMENTS OF THE INVENTION

Figure 1:
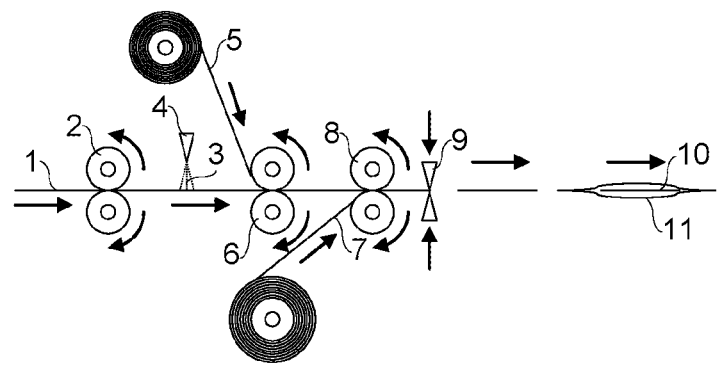
FIG. 1 is a schematic view of a preliminary operating step of this method.

FIG. 1 shows a preliminary operating step of the method for making a semi-finished item, whereby at least one layer 1 of fibre fabric is preferably pressed, for example with a calender 2, in such a way as to eliminate all gaps between weft and warp and to increase yarn tension so as to make the fabric structure more compact. The fabric layer 1 is preferably a fabric of fibres for composite materials, specifically carbon fibres, having a substantially uniform weft and/or a thickness of between 0.1 and 0.8 mm, specifically between 0.2 and 0.3 mm: for example, a carbon fibre fabric with "Twill", "Plain", "Satin", "Braided", "Unidirectional" or other type of uniform and/or regular weave pattern, specifically having a grammage of between 230 and 260 g/m2. Preferably, the fabric of the fabric layer 1 is substantially dry, that is, it contains a quantity of additives, such as adhesives or fixatives, which is less than 10% by weight. At least one layer of non-polymerized, composite material resin 3, substantially free of hardener, specifically an epoxy resin, is applied on at least one surface of the outer layer 1, in particular by means of a nebulizer 4. The resin 3 may, for example, be XB 3518 resin made by Huntsman Corporation, and is applied on the outer layer 1 in a quantity of between 2% and 7% by weight of the outer layer 1, specifically between 5 and 19 g/m2, and more specifically, approximately 12 g/m2. A protective sheet 5, specifically of plastic material such as Mylar, for example, which does not absorb humidity and thus does not shrink if ambient humidity varies, is applied by a calender 6 on the surface of the fabric 1 provided with the resin 3, which is thus covered by the protective sheet 5. This prevents creases from forming in the fabric 1 and keeps the layer of resin 3 in its original state, substantially unchanged by ambient conditions, in particular by preventing the polymerization process from starting. Therefore, since the resin 3 is not activated, the protective sheet 5 is applied removably on the layer of resin 3.

A thermoplastic film 7, preferably comprising at least one mesh of nylon, polypropylene, ABS, PLA, polycarbonate or polyethylene terephthalate is applied by a calender 8 on the surface of the outer layer 1 opposite to the surface which is provided with the resin layer 3. The fabric layer 1 thus obtained is then cut into a predetermined shape by a cutting machine 9 and the resulting semi-finished item 10 can be rolled up and/or enclosed in a sealed bag 11 to prevent contamination by external agents, such as humidity or volatile carbon during storage.

Figure 2:
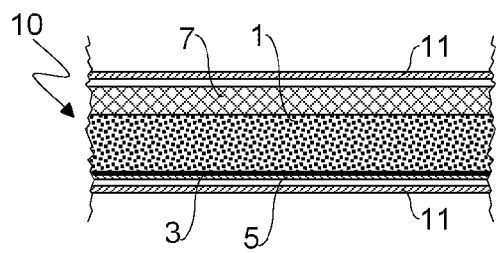
FIG. 2 is an enlarged cross section of the semi-finished item obtained from the preliminary operating step.

FIG. 2 shows the semi-finished item 10 comprising the fabric layer 1 which is provided with the resin layer 3 covered by the protective sheet 5, joined to the thermoplastic film 7 and inserted in the bag 11.

Figure 3:
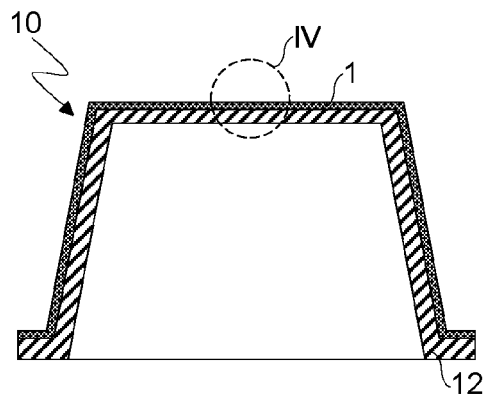
FIGS. 3, 5, 7, 9, 11, 13, 15 and 17 are schematic cross sections of further operating steps of the method.
Figure 4:
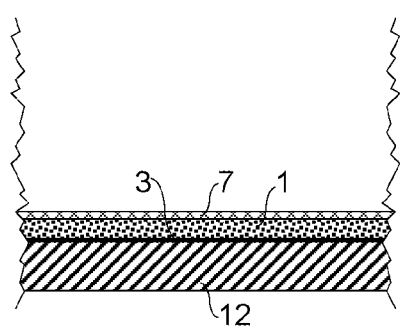
FIGS. 4, 6, 8, 10, 12, 14, 16 and 18 are enlarged views of the details IV, VI, VIII, X, XII, XIV, XVI and XVIII from FIGS. 3, 5, 7, 9, 11, 13, 15 and 17, respectively.

With reference now to FIGS. 3 and 4, it may be observed that in a first step of the method, the semi-finished item 10 is extracted from the bag 11, separated from the protective sheet 5 and placed on a first mould 12 whose functional surface is preferably convex and/or made of composite material, in particular containing carbon fibre, with the resin layer 3 positioned between the outer layer 1 and the first mould 12. The thermoplastic film 7 is thus on the side opposite the first mould 12.

Figure 5:
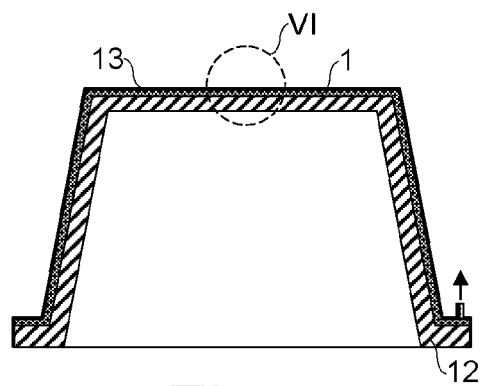
Figure 6:
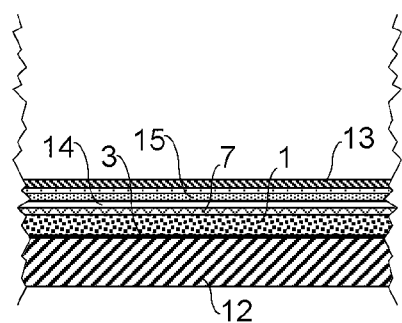

With reference now to FIGS. 5 and 6, it may be observed that in the next step of the method, the outer layer 1 is covered with a vacuum sack 13 and pressed onto the first mould 12 by pumping the air out so that the air pressure inside the vacuum sack 13 is reduced, in particular below 130 mbar. The vacuum sack 13 comprises a non-perforated peeling film 14 to prevent suction from being applied to the resin 3 deposited on the fabric 1, as well as a nylon bleeder 15 whose grammage is lower than the grammage of prior art bleeders used in prepreg methods, specifically a grammage less than 180 g/m2, and more specifically, approximately 170 g/m2.

Figure 7:
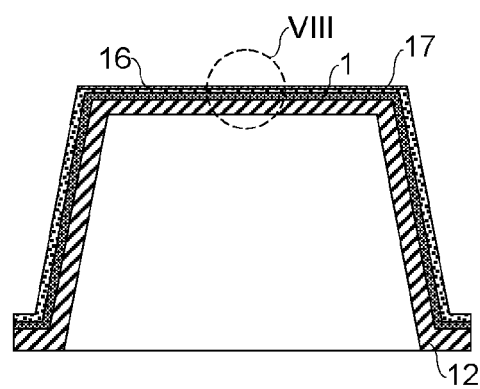
Figure 8:
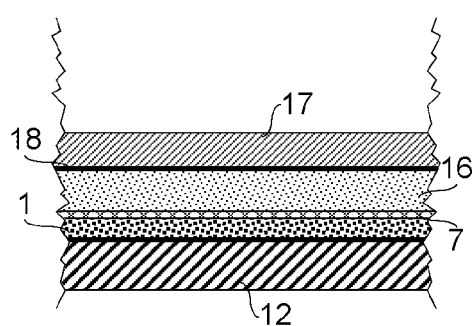

With reference now to FIGS. 7 and 8, it may be observed that in the next step of the method, the vacuum sack 13 is removed from the outer layer 1 and at least a first inner fibre layer 16, preferably comprising one or more dry carbon fibre fabrics for structural applications, is applied on the outer layer 1. In particular, the first inner layer 16 has a grammage of between 700 and 900 g/m2 and/or a thickness of between 1 and 8 mm. At least one spacer 17 made of plastic material, preferably expanded plastic material, may be placed on the first inner layer 16, which is then covered completely or partly by the spacer 17. At least one surface of the first inner layer 16, specifically the surface opposite the outer layer 1, may be provided with a binder 18—for example, thermoplastic wires mixed with the carbon fibres or an adhesive film.

Figure 9:
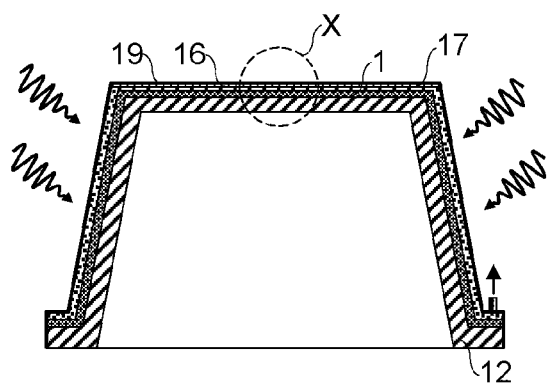
Figure 10:
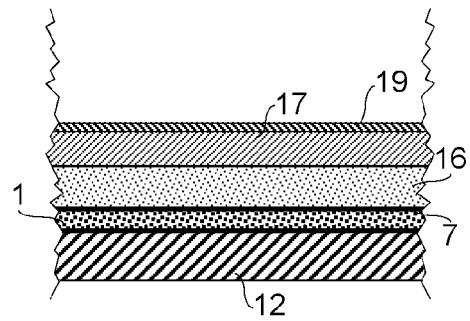

With reference now to FIGS. 9 and 10, it may be observed that in the next step of the method, the outer layer 1 and the first inner layer 16, with the spacer 17, if present, may be covered with a vacuum sack 19—for example, one that is the same as the vacuum sack 13—and pressed onto the first mould 12 by pumping the air out. At the same time, the layers 1 and 16 are heated to a temperature between 70° and 90° C., for example by infrared radiators, in such a way as to compress and at least partly melt the thermoplastic film 7 to join the outer layer 1 to the first inner layer 16 and the first inner layer 16 to the spacer 17 by means of the binder 18.

Figure 11:
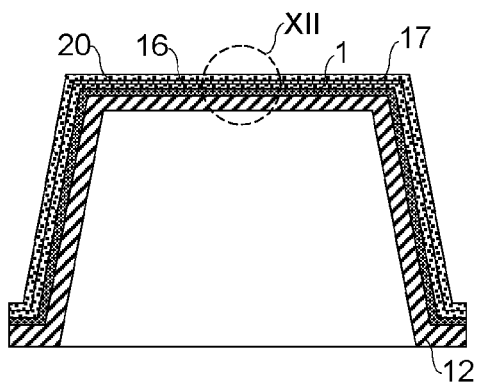
Figure 12:
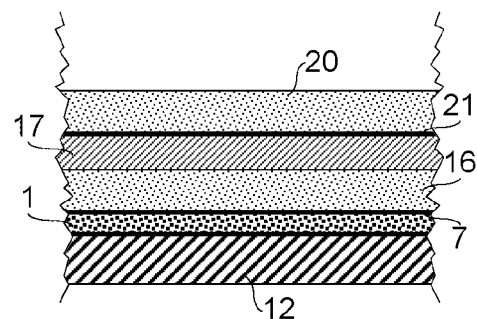

With reference now to FIGS. 11 and 12, it may be observed that in the next step of the method, the vacuum sack 19 is removed from the first inner layer 16 and at least a second inner layer 20, preferably comprising one or more dry carbon fibre fabrics for structural applications, can be applied on the first inner layer 16 and/or on the spacer 17, if present. In particular, the second inner layer 20 has a grammage of between 700 and 900 g/m2 and/or a thickness of between 1 and 8 mm. At least one surface of the second inner layer 20, specifically the surface facing the outer layer 1, may be provided with a binder 21—for example, thermoplastic wires mixed with the carbon fibres or an adhesive film.

Figure 13:
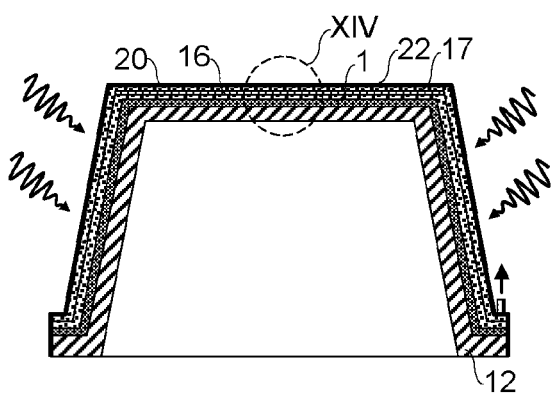
Figure 14:
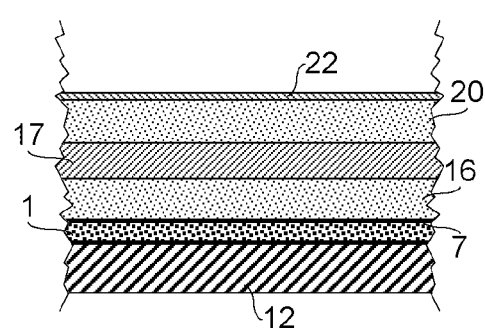

With reference now to FIGS. 13 and 14, it may be observed that in the next step of the method, the outer layer 1 the first inner layer 16 and the second inner layer 20, with the spacer 17, if present, may be covered with a vacuum sack 22—for example, one that is the same as the vacuum sack 13—and pressed onto the first mould 12 by pumping the air out. At the same time, the layers 1, 16 and 20 are heated to a temperature between 70° and 90° C., for example by infrared radiators, in such a way as to join the second inner layer 20 to the spacer 17 by means of the binder 21.

Figure 15:
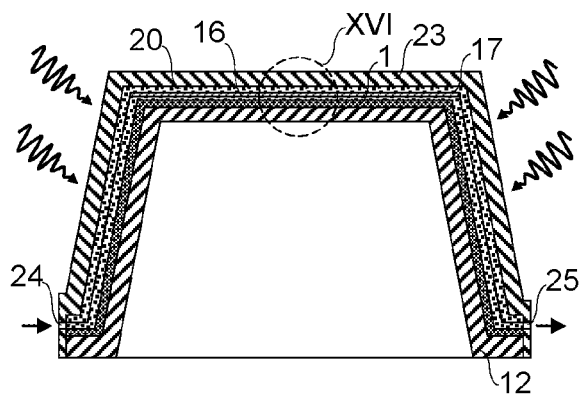
Figure 16:
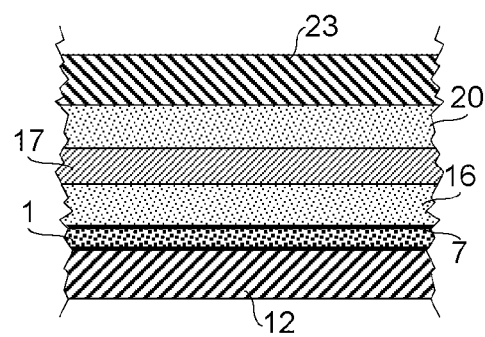

With reference now to FIGS. 15 and 16, it may be observed that in the next step of the method, the outer layer 1 the first inner layer 16 and the second inner layer 20, with the spacer 17, if present, are covered by at least a second mould 23 in such a way that the layers 1, 16 and 20 are positioned at least between the first mould 12 and the second mould 23 in a cavity which is hermetically closed by at least one perimeter seal placed between the moulds. Preferably, the functional surface of the second mould 23 is concave and/or made of composite material, in particular containing carbon fibre. The moulds 12, 23 are then fixed to each other and heated—for example in an oven at a temperature of between 45 and 90° C. —after which resin and hardener are injected between the moulds 12, 23 through at least a first nozzle 24 in order to impregnate the layers 1, 16, 20. At the same time, air is extracted from the moulds 12, 23 through at least a second nozzle 25 in the same way as, for example, in an RTM method. The nozzles 24 and/or 25 are preferably positioned at least at one edge of the layers 1, 16 and/or 20 so that injection and/or extraction occur in directions which are substantially tangential to that edge.

The hardener mixed with the resin injected through the first nozzle 24 comprises a first quantity of hardener sufficient to polymerize this resin and a second quantity of hardener sufficient to also polymerize the resin 3 applied on the outer layer 1. Preferably, the resin injected into the moulds 12, 23 is the same as the resin 3 applied on the outer layer 1, specifically an epoxy resin such as, for example, XB 3518 resin made by Huntsman Corporation. Preferably, the first and second quantities of hardener include a hardener which is compatible both with the injected resin and with the resin 3, specifically a single amine hardener such as, for example, Aradur® 22962 hardener made by Huntsman Corporation.

Preferably, the first quantity by weight of hardener mixed with the injected resin is between 20% and 30% by weight of the quantity by weight of the injected resin, whilst the second quantity by weight of added hardener for the resin 3 is between 1.5% and 55% of the first quantity.

Figure 17:
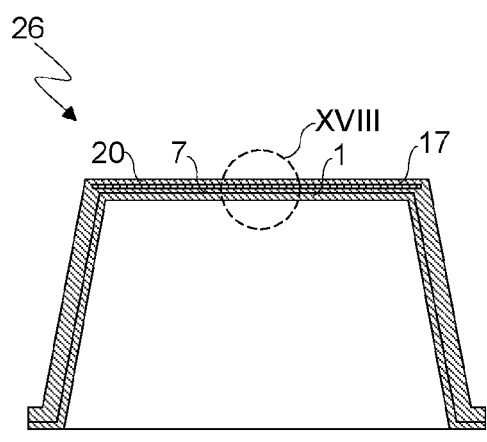
Figure 18:
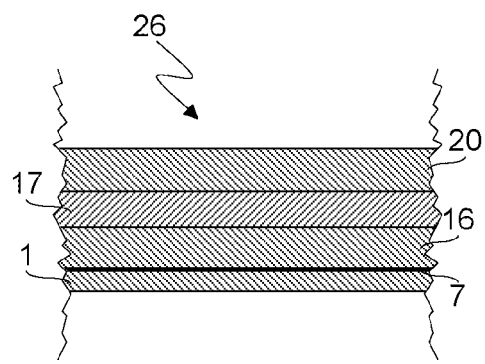

With reference now to FIGS. 17 and 18, it may be observed that after the injected resin has impregnated the layers 1, 16 and 20 and has polymerized thanks to the injected hardener, and that the resin 3 on the layer 1 has also polymerized, also thanks to the injected hardener, the finished part 26 which includes the outer layer 1, the thermoplastic film 7, one or more inner layers 16, 20, and, if necessary, at least one spacer 17, is extracted from the moulds 12, 23 and fine finished for use.

Variants or additions to the embodiment illustrated and described herein can be made by experts in the trade without departing from the scope of the claims appended hereto. In particular, further embodiments may comprise the technical features of one or more of the appended claims with the addition of one or more technical features described in the text or illustrated in the drawings, taken individually or in any combination.

The invention claimed is:

1. A semi-finished item for producing composite material products, the semi-finished item comprising:
    at least one fabric layer of composite material fiber fabric,
    at least one resin layer of non-polymerized, non-self-reacting composite material resin, substantially free of hardener to be nonactivated and have an adhesive characteristic, applied on a first surface of the at least one fabric layer,
    at least one thermoplastic film applied on a second surface of the at least one fabric layer opposite to the first surface.

2. The semi-finished item according to claim 1, and further comprising a protective sheet applied removably on the at least one resin layer.

* * * * *